Oct. 18, 1932.  R. REID ET AL  1,883,822
APPARATUS FOR FILLETING FISH
Filed May 29, 1928  5 Sheets-Sheet 4

Inventors.
Robert Reid
Andrew S. Reid
by J. Stanley Churchill
Atty.

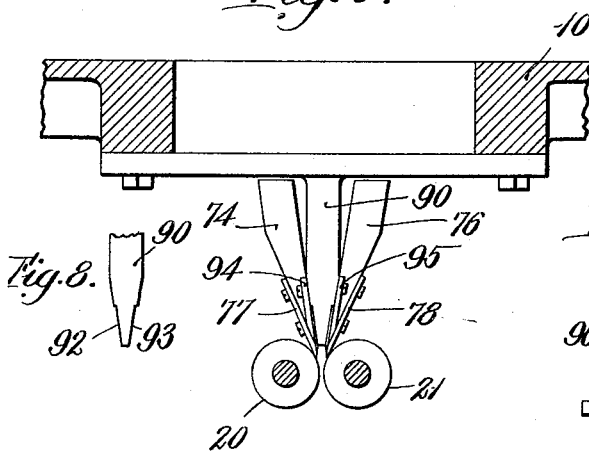
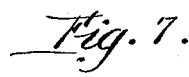
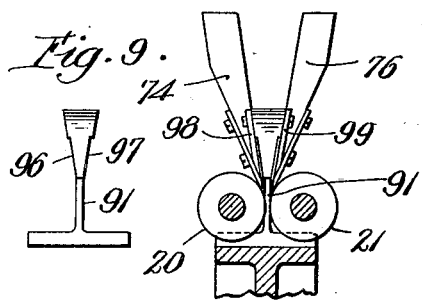
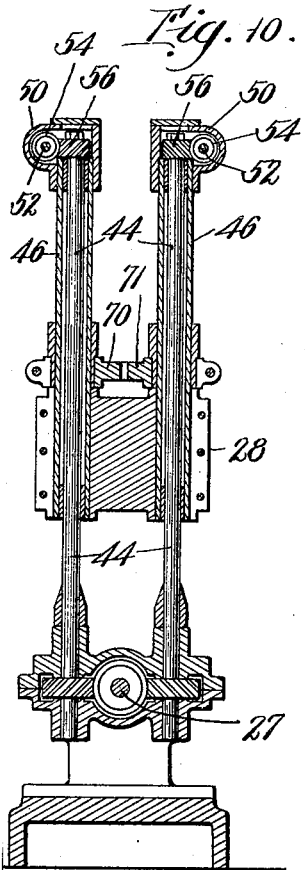
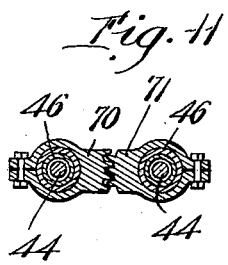
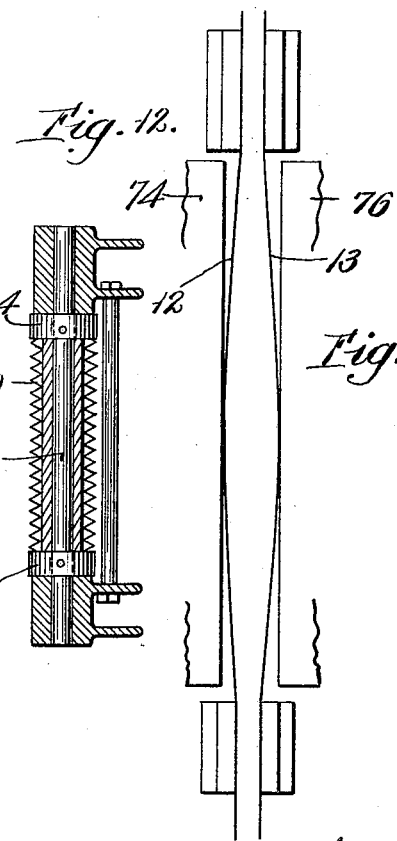

Patented Oct. 18, 1932

1,883,822

UNITED STATES PATENT OFFICE

ROBERT REID AND ANDREW S. REID, OF BEVERLY, MASSACHUSETTS

APPARATUS FOR FILLETING FISH

Application filed May 29, 1928. Serial No. 281,383.

This invention relates to a method of and an apparatus for filleting fish.

In general the object of the invention is to provide a novel method of and novel apparatus for filleting fish and by which the filleting operation may be performed in a novel, economical and highly efficient manner.

With this general object in view, the invention consists in the method and in the machine hereinafter described and particularly defined in the claims at the end of this specification.

Figure 1:
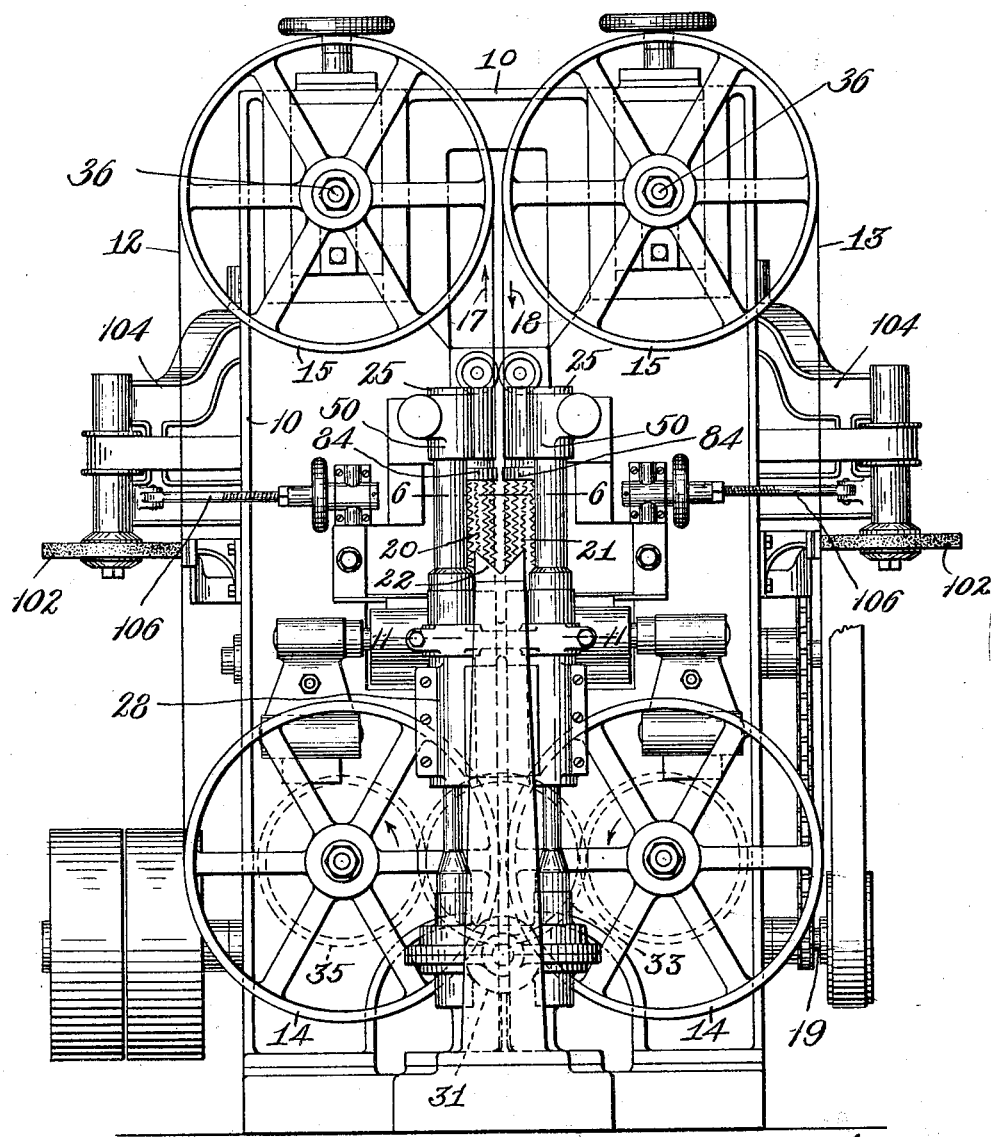
Figure 2:
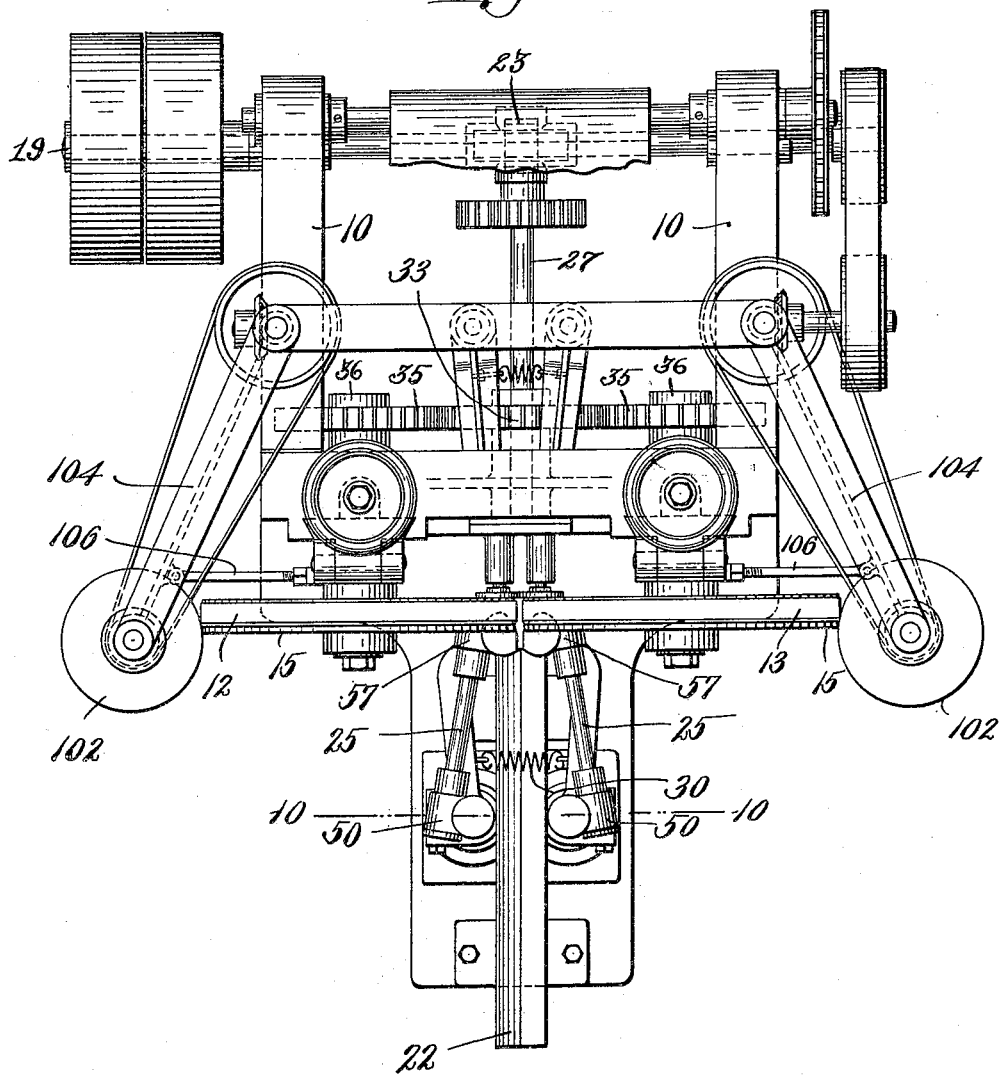
Figure 3:
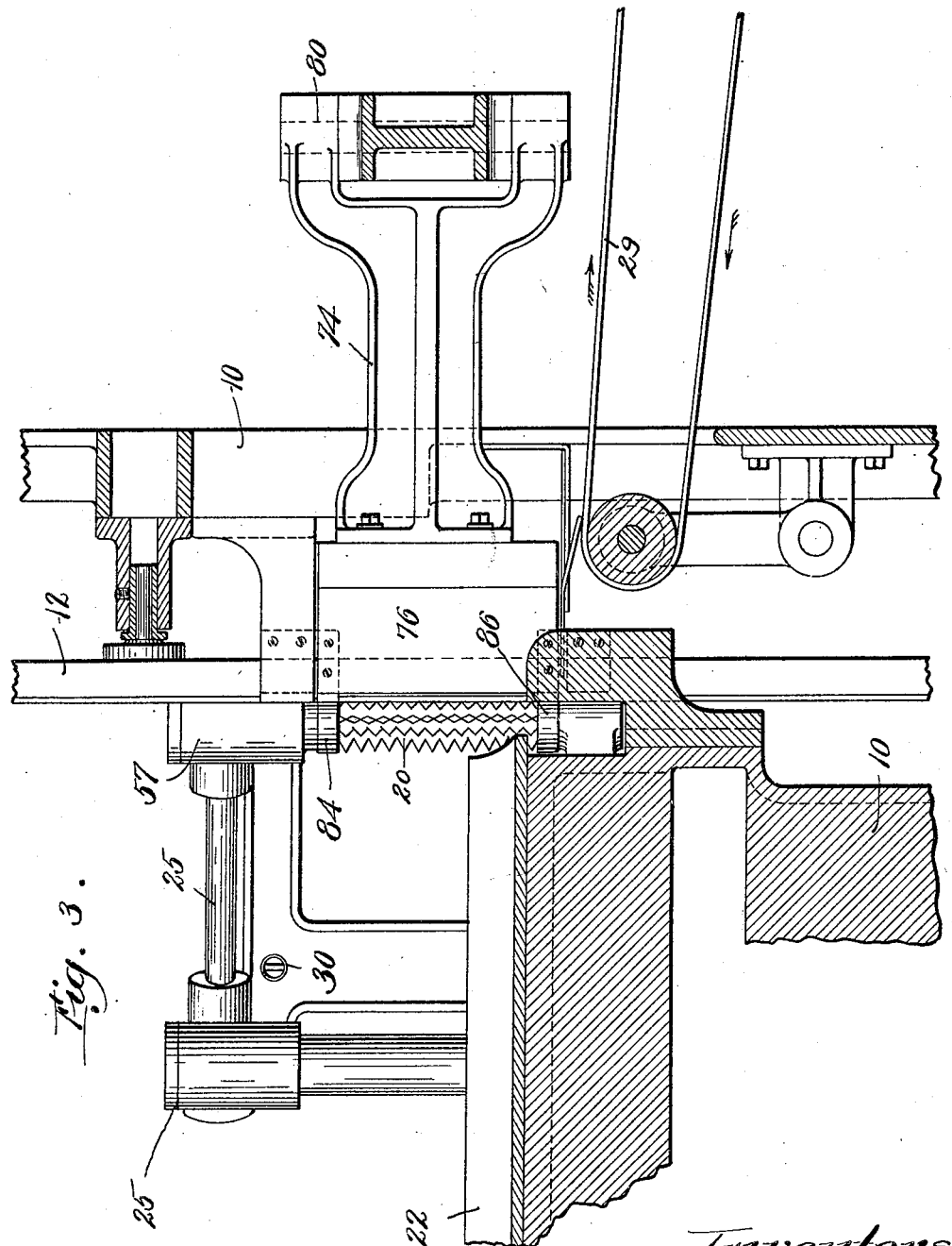
Figure 4:
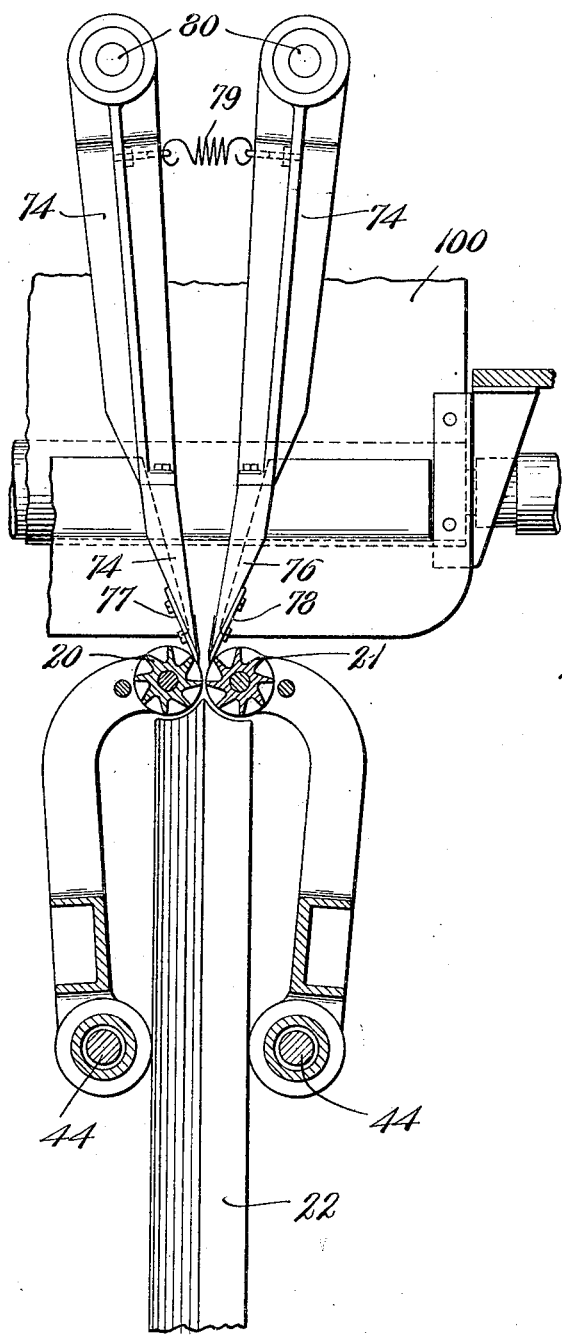
Figure 5:
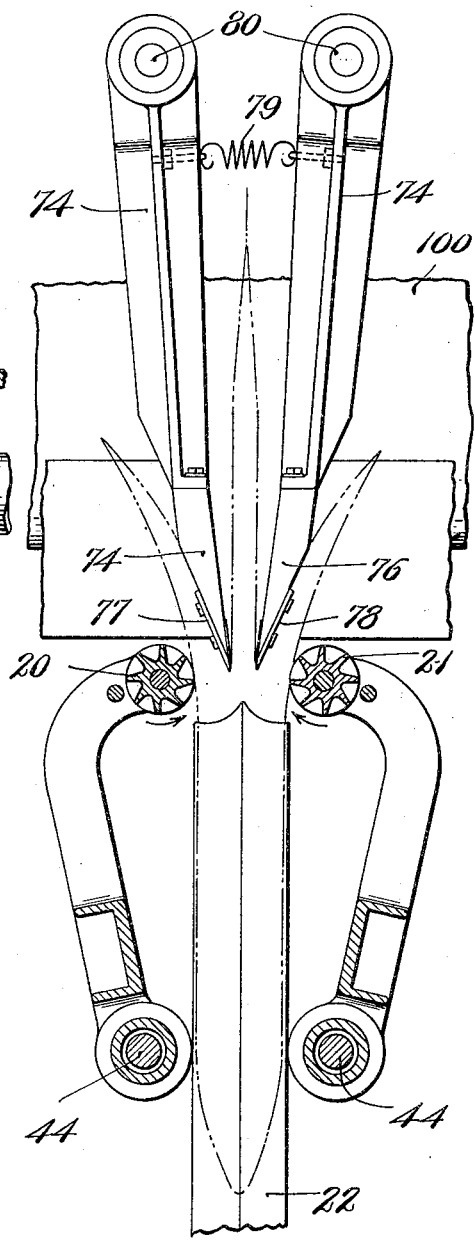

In the drawings illustrating an automatic machine for cutting fillets from fish embodying the present invention, Figure 1 is a front elevation of the machine; Fig. 2 is a plan view of the same with portions broken away; Fig. 3 is a longitudinal sectional view of a portion of the machine; Figs. 4 and 5 are sectional plans illustrating the fish feeding and cutting mechanism in different positions of operation; Fig. 6 is a sectional detail on line 6—6 of Fig. 1; Fig. 7 is a similar view taken on line 7—7 of Fig. 3; Figs. 8 and 9 are details to be referred to; Fig. 10 is a vertical sectional view taken on the line 10—10 of Fig. 2; Fig. 11 is a sectional view taken on the line 11—11 of Fig. 1; Fig. 12 is a vertical section through one of the gripping and feeding rolls and its supporting members; and Fig. 13 is a diagrammatic front elevation illustrating the guides for the band knives.

One feature of the present invention resides in an improved method of filleting fish by which the fillets may be cut from the fish in an economical, simple and efficient manner with a minimum amount of the fish meat adhering to the back bone of the fish. To this end briefly the present method contemplates feeding the fish tail first against the cutting edges of a pair of spaced apart moving knives, preferably band knives, and maintaining a yielding lateral pressure on the knives to cause them to engage the opposite sides of the tail portion of the back bone of the fish and to permit them to be moved outwardly by the increasing thickness of the back bone as the latter is forced between the knives. In this manner the filleting cuts may be made exceedingly close to the back bone.

Another feature of the present invention resides in an improved fish filleting machine for practicing the foregoing method, and which briefly and in general comprises a pair of moving cutting knives, preferably band knives having adjacent portions thereof running in substantially parallel planes spaced a short distance apart and against which the fish or other article to be cut is fed, preferably by a pair of co-operating gripping rolls. The cutting knives are arranged to be capable of being moved away from one another against a yielding pressure by the increasing thickness of the back bone of a fish fed tail first against them, and in the preferred machine provision is made for guiding the operative portions of the band knives to permit them to be moved apart by the passage between them of the back bone and for exerting a yielding pressure on each knife. In the preferred machine the fish is fed by yieldably mounted gripping rolls adapted to be forced apart by and to adapt themselves to the varying sizes and thicknesses of fish. After the cutting operation has been performed, the fillets are conveyed from the machine in separated relation to the back bone, thereby permitting their reception in suitable receptacles. Provision is preferably made for driving the gripping rolls in a novel and improved manner and for maintaining the band knives in sharpened condition by grinding wheels.

Referring now to the drawings, which as above stated illustrate the preferred machine for practicing the present method, 10 represents the frame of the machine upon which are mounted a pair of band knives 12, 13. The band knives 12, 13 are each arranged to run over a pair of pulleys 14, 15 mounted in suitable bearings in the machine frame. The pulleys 14, 15 are preferably arranged side by side to cause adjacent portions of the band knives to run in substantially parallel planes which are spaced a short distance apart. The filleting operation is performed during the operation of the machine by feeding the fish against the cutting edges of such portions of the knives. Provision is made for driving the band knives in such directions as to cause the adjacent and operative portions of the knives to travel in the direction of the arrows 17, 18, as shown in Fig. 1, and as herein shown each lower pulley 14 is driven from the main driving shaft 19 through a worm and worm wheel indicated generally at 23 to a horizontal shaft 27 extending from the rear of the machine to near the front of the machine and having a suitable bearing in the machine frame, as shown. The shaft 27 is provided with a pinion 31 which cooperates with an intermediate gear 33 to drive a pair of gears 35 on the shafts 36 upon which the pulleys 14 are mounted.

Provision is made for feeding the fish or other article to be cut transversely against the cutting edges of the adjacent portions of the band knives 12, 13, and as herein shown a pair of gripping rolls 20, 21 are provided through which the fish or other article is fed from a guide trough 22 in which it is deposited by hand and manually moved into a position in which it is engaged by the gripping rolls 20, 21. As above set forth in accordance with the preferred method of performing the filleting operation, the fish is fed against the knives tail first so that the gripping rolls 20, 21 first engage the opposite sides of the tail portion of the fish and operate to feed the tail between the band knives, enabling the latter to engage, as will be described, the opposite sides of the tail portion of the back bone. After passing through the knives both the central bone as well as the fillets which have been cut are conveyed from the machine by a suitable conveyor belt indicated generally at 29, Fig. 3.

In order to adapt the gripping rolls 20, 21 to different sizes of fish or other articles to be cut, provision is made for mounting each gripping roll upon a swing arm 25 pivoted in a supporting bearing 28 secured to the machine frame, and the arms are yieldingly urged together by a heavy coiled spring 30. The gripping rolls 20, 21 are driven from the main drive shaft 19 of the machine through mechanism which may be described as follows. The rotations of the main drive shaft 19 are as above stated transmitted through the worm and worm wheel indicated generally at 23 to the horizontal shaft 27. The shaft 27 is connected by spiral gears, see Fig. 10, to vertical shafts 44 which extend through hollow sleeves 46 journalled in the bearings 28. The arms 25 are provided with hollow sleeves 50 through which drive shafts 52 extend, and the revolutions of the vertical shafts 44 are transmitted to the shafts 52 through spiral gears 54, 56, as illustrated in detail in Fig. 10. Each shaft 52 is provided at its rear end with spiral gears (not shown) but which are located within housings 57, see Fig. 3, one of the spiral gears being fixed to the upper end of the supporting shafts 60 upon which the gripping rolls 20, 21 are mounted to turn therewith. With this construction it will be apparent that the gripping rolls 20, 21 will be rotated in all of the different positions of the arms and will operate to feed all of the different sizes of fish or other articles which the machine is designed to accommodate.

In order to accurately control the position of the filleting cuts, provision is made for insuring the feeding of the fish in a centralized position with relation to the operative portions of the band knives and accordingly the inward movement of the swing arms 25 under the influence of the heavy coil spring 30, and consequently of the feed rolls 20, 21, is limited by contact with plates 77, 78, of guide members 74, 76, arranged so that in the innermost position of the swing arms 25, each feed roll 20, 21 is spaced equidistant from the center line of the trough 22 which guides the fish in its movement into engagement with the feed rolls. In order to maintain the swing arms 25 and feed rolls 20, 21 in this same relative position with relation to the center line of the feed trough 22 in all of the different positions of the swing arms and feed rolls as the latter are moved outwardly by the passage of fish of different size therethrough, the sleeves 46, see Fig. 10, are provided with hubs upon which are clamped cooperating segmental gears 70, 71, as shown in detail in Fig. 11. With this arrangement it will be apparent that the swing arms 25 will be caused to move so as to maintain the feed rolls 20, 21 equidistant from the center line of the trough 22 in all of the operating positions of the feed rolls.

Provision is made for supporting the operating portions of the band knives in such manner as to permit such portions of the knives to yield outwardly when backbones of increasing thickness are forced by the feed rolls between the knives. As herein shown the machine is provided with a pair of yieldable guide members 74, 76. The guide members 74, 76 are of substantial length, as illustrated in detail in Fig. 13, and operate to form supports for the operating portions of the knives. The guide members are provided with steel plates 77, 78 having beveled front edges which are arranged to be interposed between the band knives and the feed rolls 20, 21, as illustrated in Fig. 4, to thus protect the band knives from engagement with the feed rolls. Incidentally as above described, the plates 77, 78 act as stops for limiting the inward movement of the feed rolls. The guide members are yieldingly urged toward one another by the coil spring 79 and are themselves pivoted upon vertical supports 80, as illustrated in Fig. 4. In their inward positions the guide members 74, 76 are limited by engagement with the hubs 84, 86 of the feed rolls 20, 21, and during the operation of the machine the guide members are moved laterally by the increasing thicknesses of backbone passing therethrough to be periodically disengaged from the hubs, and thereafter to again have a bearing upon the hubs when the machine is in operation and no fish are being fed between the feed rolls. The machine is also provided with upper and lower fixed guides for the operative portions of the band knives, and as herein shown the upper guide is formed by an arm 90 secured to the machine frame as illustrated in Figs. 3 and 6, and is provided with the recesses 92, 93 through which the band knives pass.

The band knives are retained in the recesses during their passage therethrough by guide plates 94, 95 bolted to the arm 90. The lower stationary guide is formed by a steel piece 91 of the shape illustrated in Fig. 9 provided with recesses 96, 97 for the passage of the band knives, and suitable retaining plates 98, 99 are provided to retain the band knives in the recesses 96, 97. By reference to Figs. 3 and 12 it will be observed that the operative portions of the band knives are supported by the stationary upper and lower guides while the intermediate portions of the band knives are free to be flexed outwardly by the increasing thicknesses of backbone passing therethrough, such a condition being represented in Fig. 12.

At the start of the operation of the machine, the inner position of the feed rolls 20, 21 is designed to be such as is represented in Fig. 4, wherein the feed rolls are spaced a short distance apart so as to engage the opposite sides of the tail portion of a fish as the latter is fed along by the operator while being supported by the trough 22 into engagement with the feed rolls. After the tail portion of the fish has been engaged by the feed rolls, the fish is fed against the cutting edges of the band knives whereby the fillets are cut from the opposite sides of the fish and the backbone of the fish is forced between the band knives. Thereafter the feed rolls engage the sides of the body of the fish and operate to feed it against the knives. As the fish continues to pass through the feed rolls the latter are forced apart, the arms 25 pivoting upon their supports and assuming a position such as is illustrated in Fig. 5. This condition continues until the fish has been fed through the feed rolls. The band knives operate to cut the fillets from the fish and the latter are deflected in the manner illustrated in Fig. 5 by the guide members 74, 76 and are caused to pass onto the belt 29 by which they are conveyed from the machine. The backbone of the fish is fed between the band knives and is also deposited upon the belt 29, assuming a position between the two spaced apart fillets upon the belt. As the backbone of the fish gradually increases in thickness from the tail to the head portion, the guide members 74, 76 are gradually forced apart against the spring 79 operating to maintain a yielding pressure against the band knives which insures the cutting of the fillets as close to the backbone of the fish as is practicable. During the passage of the backbone between the band knives, the latter are caused to flex outwardly in the manner illustrated in Fig. 12 into engagement with the yieldable guides 74, 76, enabling an extremely economical cut to be obtained so that a minimum amount of the fish meat adheres to the backbone after the filleting operation has been performed.

An important feature of the present machine resides in the provision of the yieldable supporting and guide members 74, 76 for accurately controlling the position of the flexible band knives and for so supporting the knives as to prevent or at least minimize the liability of their breaking. In order to keep the edges of the band knives in a sharpened condition the machine is also preferably provided with grinding wheels 102 mounted upon supporting arms 104 secured to the machine frame and which are driven by suitable belt connections, as illustrated in Fig. 2. The grinding wheels are preferably arranged to be adjustable, and as herein shown the arms 104 are pivotally mounted and held in adjusted positions by threaded rods 106.

While the preferred embodiment of the invention has been herein illustrated and described, it is to be understood that the invention will be embodied in other forms within the scope of the following claims.

Having thus described the invention what is claimed is:—

1. A fish filleting machine having, in combination, a pair of band knives having portions thereof running in adjacent planes spaced a short distance apart, guiding means for said portions of the knives including fixed upper and lower guide members, and movable guide members between said stationary guide members adapted to permit the knives to be flexed upon the passage therethrough of fish bones of varying size, means for yieldingly urging the movable guide members toward each other, and feeding means for engaging the fish and moving it transversely against said portions of the knives.

2. A fish filleting machine having, in combination, a pair of band knives arranged with portions running in adjacent planes spaced a short distance apart, a pair of feed rolls for gripping the fish to feed it against the knives, a supporting member upon which the fish may be slid into engagement with the feed rolls, yieldable supporting means for each feed roll, and yieldable guides for supporting the operative portions of the band knives.

3. A fish filleting machine having, in combination, a pair of flexible band knives having portions running in adjacent planes, yielding supporting means for supporting the outer surfaces of said portions of the knives, a pair of cooperating driven feed members mounted to be capable of movement toward and away from each other and connected positively and yieldingly together to be moved equally by a fish passing therethrough.

4. A fish filleting machine having, in combination, a pair of band knives having portions running in adjacent planes, yielding guides for the outer sides of said knives cooperating with said knives to control the lateral movements thereof and to cause them to yieldingly hug the backbone of the fish, yielding feed rolls for feeding the fish against said knives having provision for maintaining fish of varying size centralized with respect to said knives.

5. A fish filleting machine having, in combination, a pair of cutting knives having portions running in adjacent planes, a guide plate for backing up each knife, a pivoted arm upon which the guide plate is mounted, means for yieldingly connecting said arms together, a pair of driven feed rolls for feeding the fish against the cutting edges of said knives. and means for maintaining varying sizes of fish fed by said rolls in predetermined position with relation to the knives.

6. In a fish filleting machine, in combination, a pair of band knives arranged with portions running in adjacent planes spaced a short distance apart, each of said band knives being provided with a cutting edge formed by a single bevel located on the inside of said knife, the bevels on the inside of said knives cooperating to form a substantially parallel path through which the backbone of the fish may pass to thereby enable the cuts to be made in close proximity to the backbone, and means for feeding a fish transversely against the cutting edges of said knives.

7. Apparatus for filleting fish having, in combination, a pair of flexible cutting knives movable away from each other to cause the fillets to be cut and to permit the backbone to pass between the knives, said knives running in adjacent planes spaced a short distance apart and with their cutting edges in substantially the same plane, means for feeding a fish tail first against said cutting knives, and separate means for maintaining a yielding lateral pressure on the knives during the cutting operation to control the position of the knives and to cause them to hug the backbone of the fish and to permit the knives to be moved laterally by the increasing thickness of the backbone passing therethrough.

8. Apparatus for filleting fish having, in combination, a pair of band knives spaced apart and having their cutting edges lying in substantially the same plane to engage the opposite sides of the tail portion of the backbone of a fish, means for feeding the fish tail first against the cutting edges of said band knives, and separate yielding knife guiding means for maintaining a yielding lateral pressure on the band knives during the cutting operation to cause said knives to hug the backbone and to permit the knives to be flexed outwardly by the increasing thickness of the backbone passing between the knives.

9. A fish filleting machine having, in combination, a pair of band knives having portions thereof running in adjacent planes spaced a short distance apart and with their cutting edges in substantially the same plane, and means located in close proximity to the cutting edges of the knives and having at least a major portion located in advance of the knives for feeding successive fish and pushing the same transversely against said portions of the knives to perform the filleting operation.

ROBERT REID.
ANDREW S. REID.